United States Patent [19]

Inui et al.

[11] Patent Number: 4,574,293

[45] Date of Patent: Mar. 4, 1986

[54] COMPENSATION FOR HEAT ACCUMULATION IN A THERMAL HEAD

[75] Inventors: Toshiharu Inui; Haruhiko Moriguchi, both of Ebina, Japan

[73] Assignee: Fuji Xerox Co., Ltd., Tokyo, Japan

[21] Appl. No.: 611,365

[22] Filed: May 16, 1984

[30] Foreign Application Priority Data

May 23, 1983 [JP] Japan .................................. 58-90324
May 23, 1983 [JP] Japan .................................. 58-90325
May 23, 1983 [JP] Japan .................................. 58-90326

[51] Int. Cl.⁴ .......................... B41J 3/20; G01D 15/10

[52] U.S. Cl. ................................ 364/76 PH; 400/120; 219/216; 219/494

[58] Field of Search ............. 346/76 R, 76 PH, 153.1, 346/154; 219/216 PH; 400/120, 492, 494; 358/296, 300

[56] References Cited

U.S. PATENT DOCUMENTS 4,464,669 8/1984 Sekiya et al. .................... 346/76 PH

FOREIGN PATENT DOCUMENTS 0205179 12/1982 Japan .............................. 346/76 PH

*Primary Examiner*—E. A. Goldberg
*Assistant Examiner*—A. Evans
*Attorney, Agent, or Firm*—Spensley Horn Jubas & Lubitz

[57] ABSTRACT

Electric energy to be applied to each heating element of the thermal head is controlled by taking into account the energy applied to the heating element one scan period before as well as the effect of heat accumulated in heating elements surrounding the heating element, and then the energy thus controlled is recorrected taking into consideration the temperature change in a thermal head base plate or the change in printing time between lines.

57 Claims, 19 Drawing Figures

COMPENSATION FOR HEAT ACCUMULATION IN A THERMAL HEAD

BACKGROUND OF THE INVENTION

1. Field of the Invention

The present invention relates to the field of thermal heads to be used in thermal printing, and in particular, to a heat accumulation compensation method and improvement of related apparatus wherein compensation for the heat accumulation is performed taking into account the effects of heat accumulation in adjacent heating elements on a heating element currently heating printing medium.

2. Description of the Prior Art

In a conventional thermal head to be used for the thermal printing, an array of a multiplicity of heating elements are normally arranged in the main scan direction of the thermal printing medium such as a thermal printing paper and an ink donor sheet so as to corresponds to the number of picture elements in one scan line, and colors are caused to develop in the thermal printing medium which is, in slidingly contact with the heating parts of the heating elements, causing relevant heating elements to heat the medium corresponding to the picture image information.

In printing with such thermal head, effects of heat accumulation on each heating element varies according to the manner in which the image information is applied. That is, for example, when a heating element has been heated continuously in previous lines, the printing of data in the next line starts while this particular heating element does not become cool completely. On the other hand, when a heating element has not been heated for a long time, the printing of data of the next line starts with the heating element being completely cool. As a result the print density (shade level) varies in the above two cases lowering the quality of the printed picture image. Such phenomenon is particularly remarkable when a high speed printing is performed in which the printing time is less than 10 msec per line.

In order to cope with such problem, the prior art controls the width of a pulse (hereinafter called heating pulse) or voltage to be applied to heating elements currently performing printing to energize these elements. For example, when a heating element has been energized in the previous line, the width of a heating pulse is shortened when printing the current line.

However, in such prior art heat accumulation compensation system, a heating element is subject to heat accumulation compensation independently from other heating elements and the effect of the heat accumulation for heating elements adjacent to the heating element are not taken into account, making the prior art heat accumulation compensation unsatisfactory. Particularly, in the thermal printing of the transferring type which uses ink donor sheets as a printing medium, effect from heat accumulation in the adjacent heating elements is increased due to thermal diffusion on the ink donor surface, and favorable printing could not be effected.

SUMMARY OF THE INVENTION

Accordingly, an object of the present invention is to provide a heat accumulation compensation methods and devices for thermal heads capable of obtaining a good printing quality free of the shade level variation by controlling energy to be applied to each heating element while taking into account the effect of the heat accumulation in heating elements adjacent on each heating element.

According to the present invention, the energy to be applied to a heating element is controlled by taking into account the energy applied to the heating element one scan period before as well as the effect of heat accumulated in heating elements surrounding the heating element, and then the energy thus controlled is recorrected taking into consideration the temperature change in a thermal head base plate or the change in printing time between lines.

According to the first aspect of the present invention, there are provided a first step for calculating the heat accumulation state of each heating element and its adjacent elements based on the present and past image information of these heating elements, a second step for correcting the energy applied to said each heating element in printing the immediately preceding line based on the heat accumulation state calculated in the first step, and a third step for controlling the energy to be applied to each heating element in printing the present line based on information representing the corrected energy as well as the temperature of the base plate of a thermal head.

According to the second aspect of the present invention, there are provided a first step for calculating the heat accumulation state of each heating element by assigning predetermined weight values to the present and past image information of each heating element and heating elements adjacent thereto according to the information representing temperature of the thermal head base plate and the extend of effect of the heat accumulation on the heating element and then totalizing the weighted picture information, and a second step for controlling the energy to be applied to each heating element in printing the present line based on the heat accumulation state calculated in the first step and the information representing the energy applied to each heating element in printing the immediately preceding line.

In the first and second aspects, the information representing temperature of the thermal head base plate is typically calculated based on the resistance value of a thermistor normally provided in the thermal head.

Further, according to the third aspect of the present invention, there are provided a first step for calculating the heat accumulation state of a heating element based on the present and past image information of each heating element and heating element adjacent thereto, a second step for correcting the energy to be applied to the heating element in printing the immediately preceding line based on the interval time information representing the time required from the start of printing the immediately preceding line to the start of printing the present line, and a third step for controlling the energy to be applied to each heating element in printing the present line based on the heat accumulation state calculated in the first step.

Further, according to the fourth aspect of the present invention, there are provided a first step for calculating heat accumulation state of each heating element by assigning predetermined weight values to the present and past images information of each heating element and heating elements adjacent thereto according to the interval time information representing the time required from the start of printing the preceding line to the start of printing the present line and the extent of effect that the heat accumulation has on the heating element and by totalizing these weighted image information, and a second step for controlling the energy to be applied to each heating element in printing the present line based on the heat accumulation state of each heating element calculated in the first step and the information representing the energy applied to each heating element in printing the immediately preceding line.

In the aforementioned first through fourth aspects, the control of the energy applied to the heating elements is typically performed by correcting the pulse width of the heating pulse or voltage to be applied to each heating element of the thermal head.

DESCRIPTION OF THE PREFERRED EMBODIMENT

Referring to FIG. 1 through FIG. 10, the first embodiment of the present invention will be described.

In this first embodiment, the pulse width Ti to be applied to each heating element of the thermal head is determined based on the following formula.

$$Ti = f(Xi, Ti-1, Ki) \quad (1)$$

where Xi is heat history information, Ti−1 is information representing the pulse width applied to the heating element in the preceding line, and Ki is information representing temperature of the base plate of a thermal head. The heating pulse width Ti of a pulse to be applied to the heating element in the present line is determined as a function of these information Xi, Ti−1, and Ki. During a period when printing is not performed, it is not the pulse widths Ti−1 and Ti but the voltage to be applied to the heating element which is brought to 0.

First, the heat history information Xi will be explained.

Figure 1:
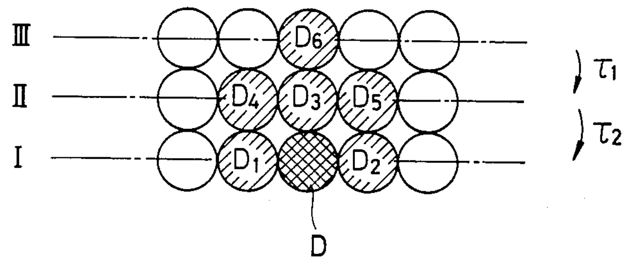
FIG. 1 illustrates the arrangement of picture element on an original to be printed.

FIG. 1 shows the arrangement of picture elements on an original to be printed. A line I is a scan line currently being printed, a line II is a line printed immediately before, and a line III is a line printed immediately before the line II was printed.

The heat accumulation state of a picture element D is determined based on whether picture elements D1 through D6 are black or white. Weight values as shown in Table are assigned to these picture elements D1 through D6 according to the extent of heat accumulation effect which causes effect on the picture element D.

TABLE 1

| Picture element | Weight value |
|---|---|
| D1 | 70 |
| D2 | 70 |
| D3 | 100 |
| D4 | 17 |
| D5 | 17 |
| D6 | 40 |

Table 2 shows an example of sum Yi of the weight values considering the fact whether or not a picture element is black or white. In Table 2, "1" signifies that the picture element is black and "0" signifies that the element is white.

TABLE 2

| Picture element | Example (a) | (b) | (c) | (d) | | (e) |
|---|---|---|---|---|---|---|
| D1 | 0 | 0 | 1 | 1 | . . . | 1 |
| D2 | 0 | 0 | 0 | 1 | . . . | 1 |
| D3 | 0 | 1 | 1 | 1 | . . . | 1 |
| D4 | 0 | 0 | 1 | 0 | . . . | 1 |
| D5 | 0 | 1 | 0 | 0 | . . . | 1 |
| D6 | 0 | 0 | 0 | 0 | . . . | 1 |
| Yi | 0 | 117 | 187 | 240 | . . . | 314 |
| Xi | 0 | 3 | 5 | 6 | . . . | 7 |

Figure 2:
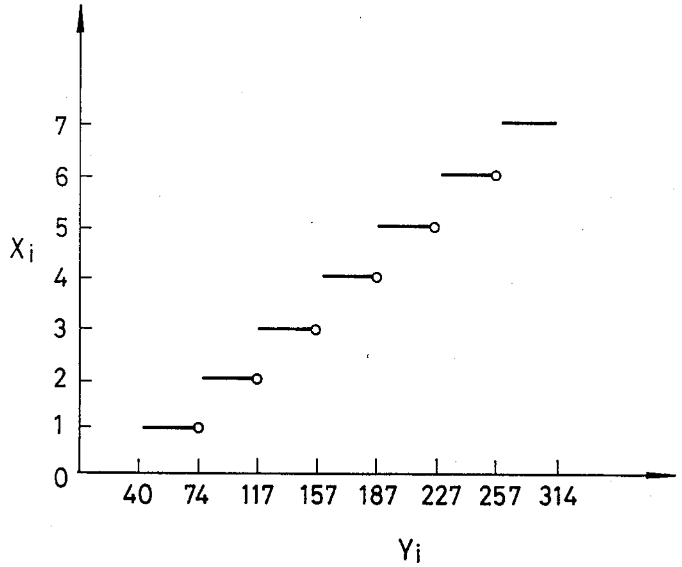
FIG. 2 is a graph for the calculation of heat history information Xi.
Figure 3:
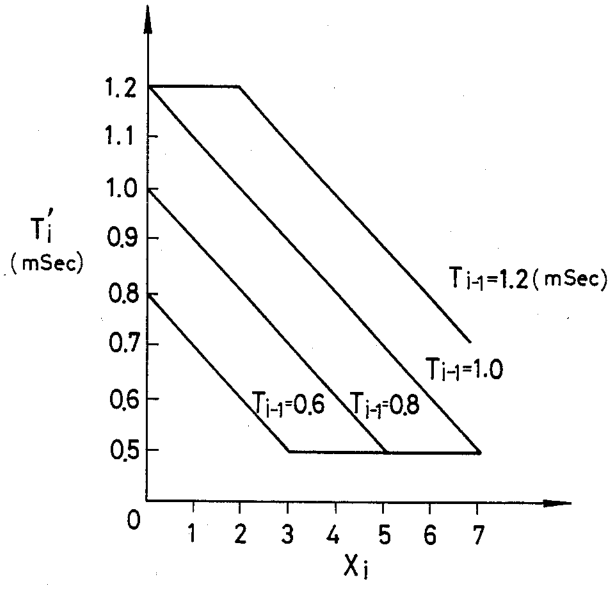
FIG. 3 is a graph showing the relationship between the heat history information Xi and the corrected pulse width T'i with the heating pulse width Ti−1 of the immediately preceding line as a parameter.

Referring to Table 2, in column, for example, (c), when the picture elements D1, D3 and D4, are black and other elements are white Yi is 187. This Yi is converted to an eight level heat history information Xi from "0" to "7" based on the relation shown in the graph of FIG. 2. In FIG. 2, Yi is plotted in abscissa and Xi in ordinate. At the bottom of Table 2, values of Xi are shown. For example, in the case of (c), Yi is 187 and Xi is 5. FIG. 3 shows the heating pulse width Ti−1 of the preceding line which is corrected based on the heat history information Xi. The upper limit value 1.2 of the corrected pulse width T'i(msec) of FIG. 3 is a pulse width to be applied to a heating element which can perform a good printing when previous picture elements are white in succession. For example, when the heat history information Xi is 3 and Ti−1 is 0.6 msec, the corrected pulse width T'i becomes 0.5 msec, while when Xi is 4 and Ti−1 is 1.0 msec, T'i becomes 0.8 msec.

Now, the information Ki representing the base plate temperature of thermal head will be explained.

Figure 4:
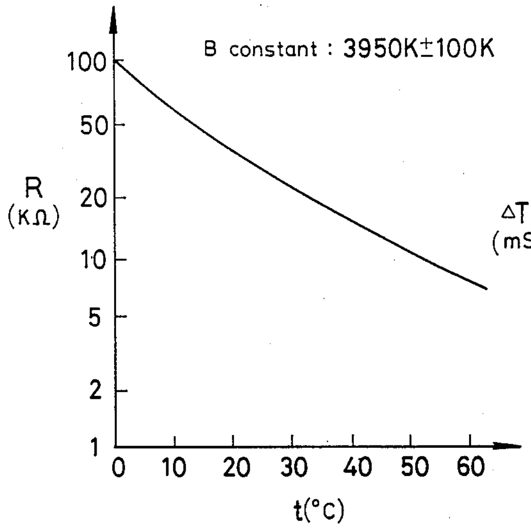
FIG. 4 is a graph showing the relationship between base plate temperature t and thermistor resistance value R.
Figure 5:
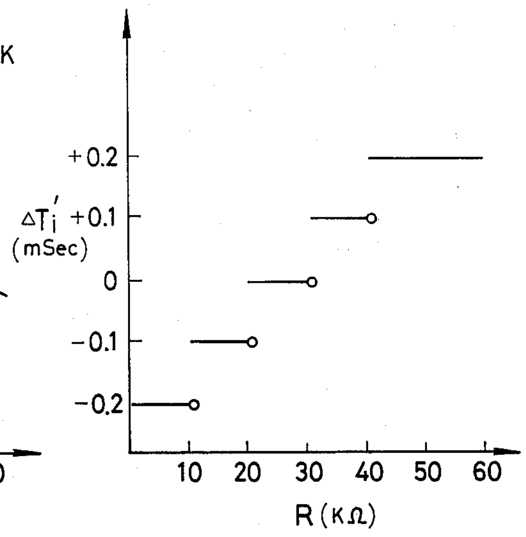
FIG. 5 is a graph showing the relationships shown in FIG. 3 through FIG. 5 collectively.

The thermal head base plate temperature t is continuously detected by a thermistor mounted on the base plate. FIG. 4 shows the relationship between resistance value R of the thermistor and the base plate temperature t. As seen in this drawing, the thermistor resistance value R and the base plate temperature t are approximately in a proportional relationship. The base plate temperature t can be known by detecting the thermistor resistance value R. The information Ki corresponds to the thermistor resistance value R. FIG. 5 shows the relation when the corrected pulse width T'i is further corrected in accordance with the thermistor resistance vlaue R, in which ΔT'i represents a value to be added to or reduced from the corrected pulse width T'i. In FIG. 4 and FIG. 5, when the base plate temperature t is, for example, 34° C., the thermistor resistance value R is 20 KΩ, and ΔT'i at this time is 0 msec. On the other hand, when the base plate temperature t is 18° C., the thermistor resistance value R becomes 40 KΩ, and ΔT'i at this time is +0.2 msec.

Although the thermistor is typically mounted on the rear side of the base plate, it may be designed such that a single thermistor is provided on a single thermal head base plate or a plurality of thermistors are provided at various points of a single thermal head base plate, the resistance values of those thermistors being averaged and the thermal head base plate temperature t being obtained based on the average value. Further, when a fine control is required, it may be designed such that the thermal head base plate is divided to a plurality of areas with a single thermistor being provided in each area, and for the heating elements in each area the heat accumulation compensation is performed based on the resistance value of the thermistor in the corresponding area.

Figure 6:
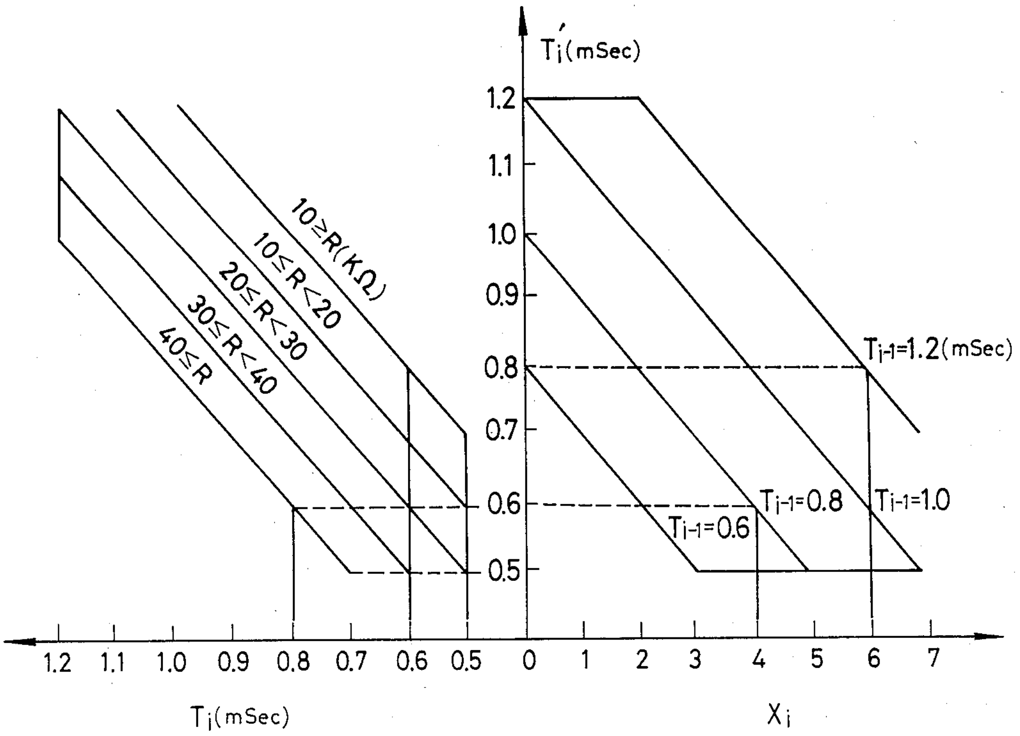

FIG. 6 is a graph in which the relationships shown in FIG. 3 through FIG. 5 are combined. According to the relation in FIG. 6, when the heat history information Xi is 4 and the pulse width Ti−1 of the preceding line is 0.8 msec, T'i becomes 0.6 msec, and further when the thermistor resistance value R at this time is 40 kΩ, the heating pulse width Ti of the present time for this heating element becomes 0.8 msec. Still further, when the heat history information Xi is 6 and the pulse width Ti−1 of the preceding line is 1.2 msec, T'i becomes 0.8 msec, and if the thermistor resistance value R at this time is 10 kΩ, the pulse width Ti of the present time becomes 0.6 msec.

Figure 7:
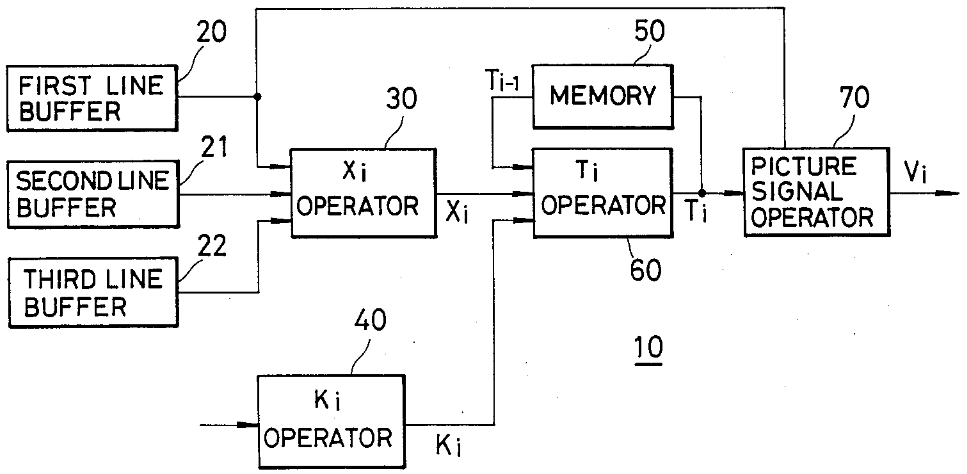
FIG. 7 is a block diagram showing a typical configuration of the apparatus embodying the first aspect of the present invention.

FIG. 7 shows a typical configuration of a heat accumulation compensation circuit 10 designed based on the heat accumulation compensation method of the first embodiment given above.

Figure 8:
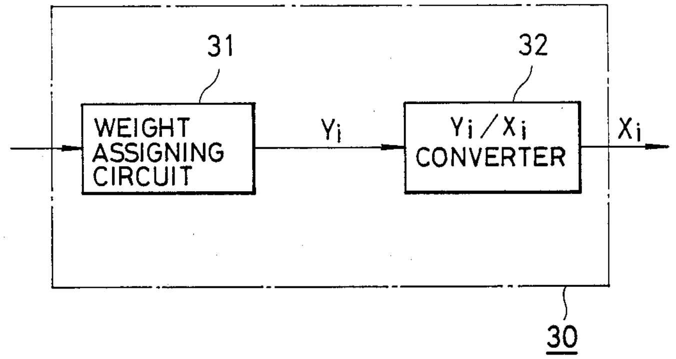
FIG. 8 is a block diagram showing a typical configuration of the Xi operator.

Referring to FIG. 7, the heat accumulation compensation circuit 10 comprises a first line buffer 20, a second line buffer 21 and a third line buffer 22 each having memory areas corresponding to the total number of heating elements of the thermal head. The first line buffer 20 stores picture information corresponding to the scan line to be printed at the present time, the second line buffer 21 stores picture information corresponding to the scan line printed at the time immediately before, and the third line buffer 22 stores picture information corresponding to the scan line printed at the time before the last. An Xi operator 30 sequentially calculates the heat history information Xi of each heating element of the line to be printed at present based on the picture information stored in the line buffers 20, 21 and 22, and outputs the results of calculation to a Ti operator 60 sequentially. As shown in FIG. 8, the Xi operator 30 includes a weight assigning circuit 31 and a Yi/Xi converter 32. The weight assigning circuit 31 assigns the weight value shown in Table 1 to each picture information (refer to FIG. 1) to be fed 6 bits by 6 bits for a one-dot heating element, sums up these 6 bits, and outputs the result Yi of the summation to the Yi/Xi converter 32. The Yi/Xi converter 32 converts Yi fed sequentially into the heat history information Xi of 8 levels from "0" to "7" based typically on the relation shown in the graph of FIG. 2, and outputs the heat history information Xi to the Ti operator 60 sequentially. These weight assigning circuit 31 and the Yi/Xi converter 32 may be comprised of memory means, arithmetic circuit, etc.

A Ki operator 40 is connected to a thermistor (not shown) mounted on the base plate of the thermal head, and the information representing the thermistor resistance value R corresponding to the base plate temperature t in that particular instant is fed constantly from the thermistor. The Ki operator 40 converts this information to a multilevel signal of several levels, typically stepping at every 10 kΩ as shown in FIG. 5, and outputs the signal to the Ti operator 60. A memory 50 is for storing the information representing the heating pulse width of each dot calculated by the Ti operator 60, and the memory content of the memory 50 is updated as the scan line to be printed advances. Accordingly, Ti−1 outputted from the memory 50 and fed back to the Ti operator 60 becomes the information showing the heating pulse width of the previous scan line for the Ti operator 60.

The Ti operator 60 calculates the heating pulse width Ti to be applied to each heating element based on the information Xi, Ki, and Ti−1 from, say, the relation shown in FIG. 6, and feeds Ti to the memory 50 and a picture signal operator 70.

To the picture signal operator 70 the heating pulse width information Ti is fed from the Ti operator 60, and the picture information of the current scan line is fed from the first line buffer 20. Prior to the printing of a line, the picture signal operator 70 first outputs the picture information obtained from the first line buffer as an output Vi without changing its form. In this case, the shortest heating pulse width to be applied to each heating element of the thermal head is set at 0.5 msec, and the longest heating pulse width at 1.2 msec. Then, the picture signal operator 70 picks up picture elements in which the heating pulse width is 0.6 msec or more based on the heating pulse width information Ti which are fed sequentially from the Ti operator 60. Then, the picture signal operator 70 outputs picture elements whose heating pulse width is 0.6 msec or more as logical value "1". A series of operation mentioned above are repeated until the picking up of picture elements in which the heating pulse width is 1.2 msec is completed.

Figure 9:
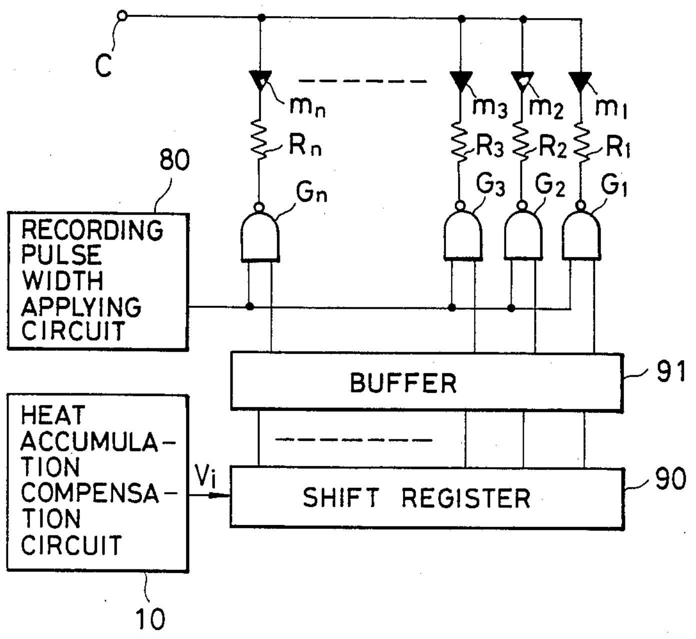
FIG. 9 is a circuit diagram showing circuitry of a thermal head.

FIG. 9 shows a typical configuration of the thermal head.

In FIG. 9, the thermal head comprises rectifying diodes ml to mn which are connected to heating elements Rl to Rn respectively, and power is supplied from a terminal C through these diodes ml to mn to heat individual heating elements. Other sides of the heating elements Rl to Rn are connected to output terminals of NAND gates Gl to Gn respectively. These NAND gates Gl to Gn are typically of the open collector type, and operate so as to direct a printing current to be applied from the terminal C to the heating elements only when the AND condition is satisfied at the NAND gates Gl to Gn.

The configuration of the heat accumulation compensation circuit 10 is shown in FIG. 7. Picture information Vi in the aforementioned sequence are outputted to a shift register 90. The shift register 90 is of the serial input parallel output type, and shifts the picture information Vi fed serially to a position in which the resistor is to be heated based on a transfer clock. After the completion of the specified shift by the shift register 90, the picture information is stored in a buffer 91 temporarily. During the shift operation by the shift register 90, the buffer 91 holds the picture information of the preceding time, and feeds it to the gates Gl to Gn, thereby preventing the heating resistor from releasing heat while the heating pulse is being applied. A heating pulse width applying circuit 80 controls the width of the heating pulse to be applied to the gates Gl to Gn, width will be described later.

Figure 10:
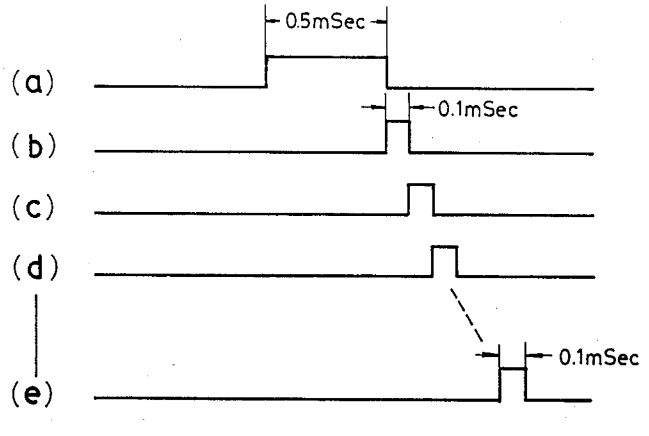
FIG. 10 is a time chart illustrating the operation of the circuitry in FIG. 9.

Typical operation of the device shown in FIG. 9 will now be described with reference to the time chart shown in FIG. 10. FIG. 10 shows pulses to be output from the heating pulse applying circuit 80.

In printing a single scan line, picture information Vi, in other words picture information for current scan line, which is logical value "1" for every heating resistor to perform printing at this time (hereinafter referred to as the first picture information) and logical value "0" for other heating resistor is first fed from the heat accumulation compensation circuit to the shift register 90 sequentially. The shift register 90 shifts the first picture information up to a predetermined bit position, and then transfers it to the buffer 91. The buffer 91 feeds the first picture information to the gates Gl to Gn in parallel. In conjunction with the above feeding, a heating pulse of the shortest pulse width of 0.5 msec is fed from the heating pulse applying circuit 80 to each gate (refer to FIG. 10(a)). As a result, every heating resistor corresponding to the first picture information Vi is energized for a period of 0.5 msec.

As, the first picture information is transferred from the shift register 90 to the buffer 91, second picture information is fed to the shift register sequentially. The second picture information eventually picks up the picture elements corresponding to the heating elements to be applied the heating pulse whose width is 0.6 msec or more from the first picture information. The second picture information represents logical level "1" only for the picture elements thus extracted. Similar to the first picture information, this second picture information is transferred to the buffer 91, and thence fed to the gates $G_l$ to $G_n$. In synchronizm with the feeding above, a pulse having the heating pulse width of 0.1 msec is fed to each gate from the heating pulse applying circuit 80 (refer to FIG. 10(b)). As a result, the heating elements corresponding to the second picture information are eventually energized for a period of 0.6 msec (0.5+0.1). In this connection, operations of the heat accumulation compensation circuit 10, the shift register 90, the buffer 91, and the heating pulse applying circuit 80 are synchronized, and, it is so designed that before the beginning of heat release of the heating elements, the heating pulse is applied.

Then, in the same manner as mentioned above, third picture information outputted from the heat accumulation compensation circuit 10 enters each gate through the shift register 90 and the buffer 91. The third picture information eventually extracts picture elements corresponding to the heating elements to which the heating pulse whose pulse width is 0.7 msec or more is applied from the second picture information. This third picture information represents logical level "1" only for the information thus extracted. When the third picture information is fed to each of the gates Gl to Gn, a 0.1 msec additional pulse is output from the heating pulse applying circuit 80 (refer to FIG. 10(c)). Accordingly, it eventually results that the heating resistor corresponding to the third picture information is energized for a period of 0.7 msec together with the previous energizing.

By the subsequent applications of 0.1 msec additional pulses in the similar fashion, energizing of the heating elements for a period of up to 1.2 msec is performed.

Although in this embodiment, as shown in FIGS. 5 and 6, the resistance value of the thermistor is graduated in 10 kΩ threshold values and the pulse width of the heating pulse is adapted to change according to that gradient, it is obvious that the selection of the threshold value for the gradient is optional, and a suitable value may be employed according to the various conditions.

Figure 11:
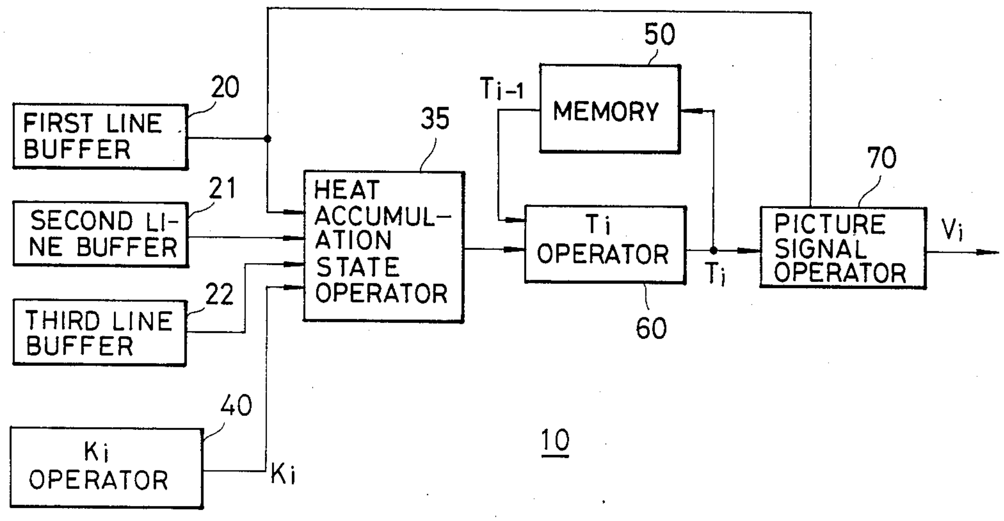
FIG. 11 is a block diagram showing a typical configuration of an apparatus embodying the second aspect of the present invention.

Referring now to FIG. 11, the second embodiment of the present invention will be described. FIG. 11 shows a typical configuration of the heat accumulation compensation circuit 10.

In FIG. 11, similar reference numerals and characters are used for similar component elements as shown in FIG. 7, and the description thereof is omitted.

A heat accumulation state operator 35 assigns a specified weight value to each picture information which is fed 6 bits by 6 bits from the first, second, and thrid line buffers 20, 21 and 22 corresponding to the extent of effect of heat accumulation on the heating element and also corresponding to the information Ki representing the thermal head base plate temperature to be fed from a Ki operator 40, sums up these 6 bits, converts the resultant sum to a 8-level (typically from "0" to "7") multilevel information, and enters the resultant information to a Ti operator 60. The Ti operator 60 determines the heating pulse width for each heating element ready to print based on the multilevel information and the information Ti−1 representing the heating pulse width of the preceding line to be fed from a memory 50.

That is, while in the first embodiment, a weight value is assigned to each picture information to be fed 6 bits by 6 bits corresponding only to the extent of the effect of heat accumulation on the heating element, the values are summed up, and the sum is corrected according to the thermal head base plate temperature, in the second embodiment, a weight value corresponding to both the thermal head base plate temperature and the extent of the effect of heat accumulation on the heating element is assigned to each picture information to be fed 6 bits by 6 bits, and these weight values are summed up. Except the difference described above, the output to be obtained from a device 10 of the second embodiment is the same as that to be obtained from the device of the first embodiment shown in FIG. 7.

The third embodiment of the present invention will now be described.

In the third embodiment, the pulse width Ti to be applied to each heating element of the thermal head is determined by the following formula.

$$Ti=f(Xi, Ii, Ti-1) \quad (2)$$

where Xi is heat history information, Ii is an interval time information indicating the period between scan lines, and Ti−1 is a heating pulse width information of the previous scan line which concerns each heating element. The heating pulse width Ti in the present line of the heating element is determined as a function which takes these three information as parameters. In this case, for the heating element not subject to printing the heating pulse width Ti−1 and Ti are not zero but the applied voltage is zero.

The heat history information Xi is the same as that shown in the first embodiment. The weight value shown in Table 1 is assigned to each picture element D1 to D6 (refer to FIG. 1), the weight values are summed up, and then the resultant sum is converted to a multi-level information from "0" to "7" based on the relation shown in the graph of FIG. 2. In this manner, the heat history information Xi can be calculated.

Figure 12:
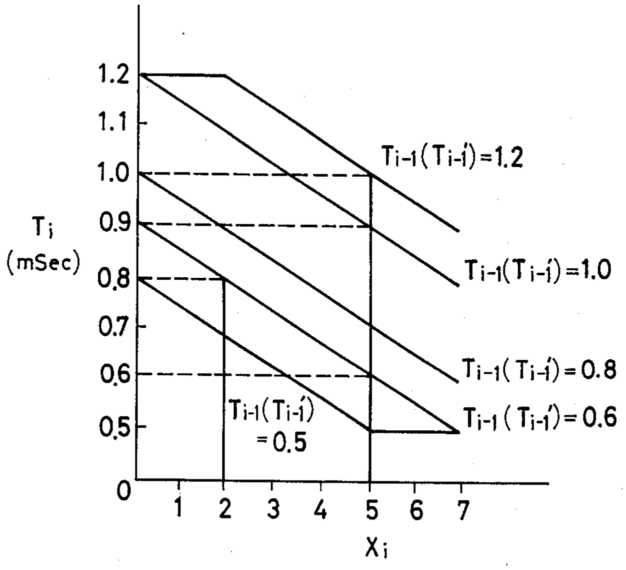
FIG. 12 is a graph showing the relationship between the heat history information Xi and the corrected pulse width Ti with the heating pulse width Ti−1 of the immediately preceding line and the false pulse width Ti−1' as parameters.

When the heating pulse width of the heating element in the present print line is set based on the heat history information Xi and the heating pulse width Ti−1 of the preceding line, the result becomes as shown in FIG. 12. For example, when the heat hisory information Xi is 5 and Ti−1 is 0.6 msec, Ti becomes 0.6 msec, while when Xi is 2 and Ti−1 is 0.6 msec, Ti becomes 0.8 msec.

On the other hand, even when a heating pulse of the same pulse width is applied when the heat history information Xi and the heating pulse width of the preceding line are equal, it is possible that the print density (shade level) differs. This fact owes much to the difference in an interval time Ii. The interval time Ii is a period from the start of the printing of a certain scan line to the start of the next scan line. In FIG. 1, II is the interval time from the start of the printing of the line III to the start of the printing of the line II, and I2 is the interval time from the start of the printing of the line II to the start of the printing of the line I. For example, when the case when T2 of FIG. 1 is 5 msec is compared with the case when T2 is 10 msec, the effect of remaining heat of a black data in the line II differs. Accordingly, even when the heat history information Xi and Ti−1 are equal, if T2 differs, print density (shade level) variation would result even when a pulse of the same pulse width is applied to those lines.

Figure 13:
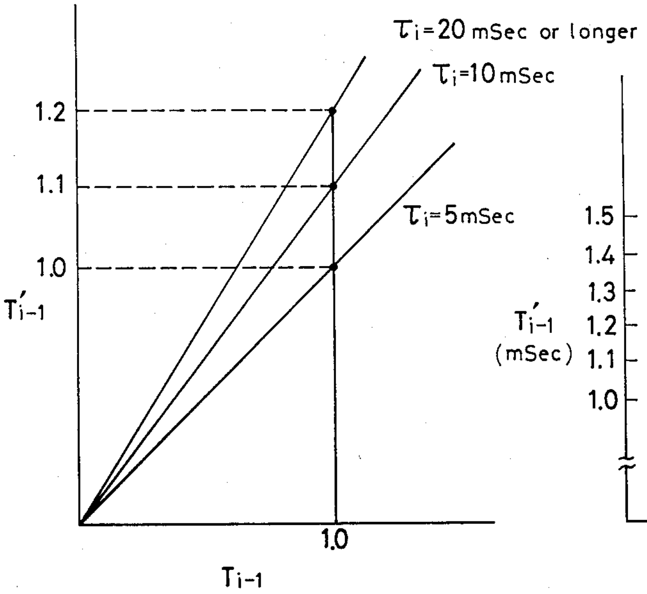
FIG. 13 is a graph showing the relationship between the printing pulse width Ti−1 of the immediately preceding line and the false pulse width Fi−1 with the interval time Ii as a parameter.

In order to solve such problem, particularly in the third embodiment, the heating pulse width Ti−1 of the preceding scan line is changed artificially (falsely) based on the interval time ti, and subsequent processing is performed taking the false pulse width Fi−1 thus changed as the heating pulse width Ti−1 of the previous scan line. The relationship between Ti−1 and Fi−1 is shown in FIG. 13. As evident from FIG. 13, the longer the interval time Ii, the lower the temperature of the heating element becomes due to heat release. Accordingly, the false pulse width Fi−1 is lengthened proportionally. More detailed relationship between the interval time Ii and the false pulse width Fi−1 in the case of Ti−1=1.0 msec is shown in FIG. 14.

Figure 14:
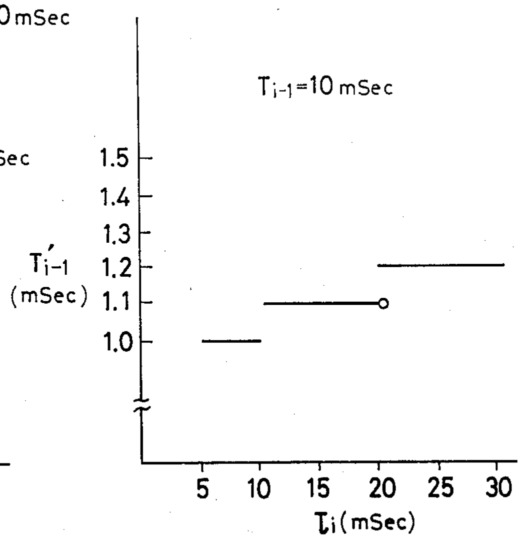
FIG. 14 is a graph showing the relationship of FIG. 13 by another aspect.

According to FIG. 14, if the interval time Ii is 5 msec when the pulse width Ti−1 of the previous scan line was 1.0 msec, Fi−1 becomes 1.0 msec. Further, if the heat history information in this case is 5, the pulse width Ti of the present line becomes 0.9 msec. However, if, in the same condition as above, the interval time Ii is set at 20 msec, Fi−1 becomes 1.2 msec, and Ii 1.0 msec.

By changing the heating pulse width Ti−1 of the preceding scan line by means of such approximation, it becomes possible that, even when the interval time Ii becomes different, optimum heating pulse width Ti to be applied to each heating element can always be calculated.

Figure 15:
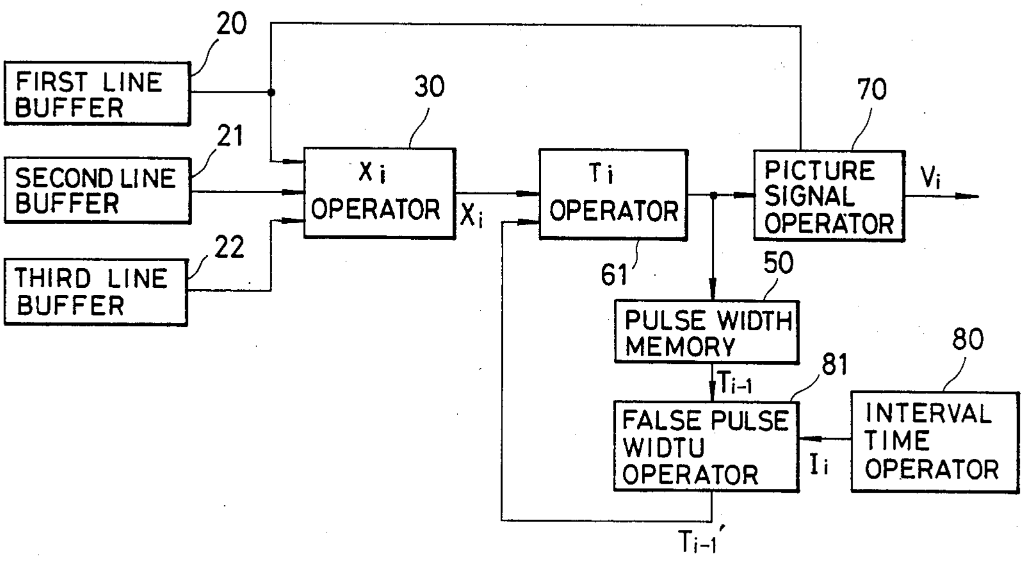
FIG. 15 is a block diagram showing a typical configuration of an apparatus embodying the third aspect of the present invention.

FIG. 15 shows a typical configuration of the heat accumulation compensation circuit 10 composed based on the heat accumulation compensation method which is in line with the third embodiment.

In FIG. 15, first, second and third line buffers 20, 21 and 22, an Xi operator 30, a pulse width memory 50 and picture signal operator 70 are totally identical with those shown in FIG. 7 and FIG. 11.

An interval time operator 80 outputs interval time information Ii representing each interval time to a false pulse width operator 81 from time to time. The false pulse width operator 81 calculates the false pulse width Fi−1 from the relations shown in FIGS. 13 and 14 based on the information representing the heating pulse width of the preceding scan line to be fed from the pulse width memory 50 and the interval time information Ii and feeds Fi−1 to a Ti operator 61. The Ti operator 61 calculates the heating pulse width Ti to be applied to each heating element from the relation shown in FIG. 12 based on the heat history information Xi calculated by the Xi operator 30 and the false pulse width information Fi−1 and feeds Ti to the memory 40 and a picture signal operator 70. The picture signal operator 70 extracts picture information as described previously, and sequentially outputs the extracted picture information. This picture information Vi is fed to the thermal head driving circuit shown in FIG. 9. By a series of operations similar to aforementioned operations, the heating elements R1 through Rn are heated.

The fourth embodiment of the present invention will now be described.

In this embodiment, the pulse width Ti to be applied to each heating element of the thermal head is determined based on the following equation.

$$Ti=f(Zi, Ti-1) \quad (3)$$

where $$Zi-g(Xi, Ii) \quad (4)$$

In the above equations (3) and (4), Zi is information representing the heat accumulation state of each heating element, and Ti−1 is the information representing the heating pulse width of the preceding scan line. Zi is calculated based on the heat history information Xi and the interval time information Ii representing the period between scan lines. Accordingly, the heating pulse width Ti in the present scan line of the heating element is determined as a function which takes Zi and Ti−1 as parameters. When no printing is performed, the heating pulse width Ti−1 and Ti are not taken as zero but the voltage applied to the heating element is taken as zero.

The heat history information Xi is identical with that shown in the first embodiment and that shown in the third embodiment. A predetermined weight value shown in Table 1 is assigned to each picture element D1 to D6 (refer to FIG. 1), these weight values are summed up, and the resultant value is converted to a multilevel information from "0" to "7" based on the relation shown in the graph of FIG. 2. In this manner, heat history information Xi is calculated.

On the other hand, even when the heat history information Xi and the heating pulse width Ti−1 are equal, it is possible that the print density (shade level) varies even if a heating pulse of the same pulse width is applied in the present scan line, if the interval time Ii varies.

Based on this fact, in the fourth embodiment, the weight values to be assigned to the picture elements D1 to D6 (refer to Table 1) are changed according to the change in the interval time Ii.

Tables 3 and 4 show the relationship between the weight values of the picture element D1 through D6 and the interval times Ii and I2 (refer to FIG. 1).

TABLE 3

| Picture element | $\tau_2$ Interval time (msec) 5~10 | 10~20 | Over 20 |
|---|---|---|---|
| D1 | | 70 | |
| D2 | | 70 | |
| D3 | 100 | 50 | 20 |
| D4 | 17 | 8 | 4 |
| D5 | 17 | 8 | 4 |

TABLE 4

| Picture element | $\tau_1$ (msec) Interval time: 5~10 | | | 10~20 | | | Over 20 |
|---|---|---|---|---|---|---|---|
| $\tau_2$ | 5~10 | 10~20 | over 20 | 5~10 | 10~20 | Over 20 | Over 5 |
| D6 | 40 | 20 | 0 | 10 | 0 | 0 | 0 |

According to Tables 3 and 4, the weight value of, for example, the picture element D3 is "100" when the interval time I2 from the line II to the line I is 7 msec, and "20" when I2 exceeds 20 msec. Further, when the weight value of the picture element D6 is "20" when the interval time I1 from the line III to the line II is 7 msec and I2 is 15 msec, and "0" when I1 is 15 msec and I2 is 15 msec.

Table 5 shows the sum Yi of the weight values (Tables 3 and 4) of the picture elements D1 to D6 considering the fact whether the color of the picture element is black or white, as an example. In Table 5, black is represented by "1", and white is denoted by "0". Further, in this case, I1 is 7 msec, and I2 is 15 msec.

TABLE 5

| Picture element | Example (a) | (b) | (c) | (d) | | (e) |
|---|---|---|---|---|---|---|
| D1 | 0 | 0 | 0 | 1 | . . . | 1 |
| D2 | 0 | 0 | 0 | 0 | . . . | 1 |
| D3 | 0 | 1 | 1 | 0 | . . . | 1 |
| D4 | 0 | 0 | 0 | 1 | . . . | 1 |
| D5 | 0 | 0 | 0 | 0 | . . . | 1 |
| D6 | 1 | 0 | 1 | 1 | . . . | 1 |
| Yi | 20 | 50 | 70 | 98 | . . . | 226 |
| Zi | 0 | 1 | 1 | 2 | . . . | 5 |

$\tau 1$ = 7 msec
$\tau 2$ = 15 msec

Figure 16:
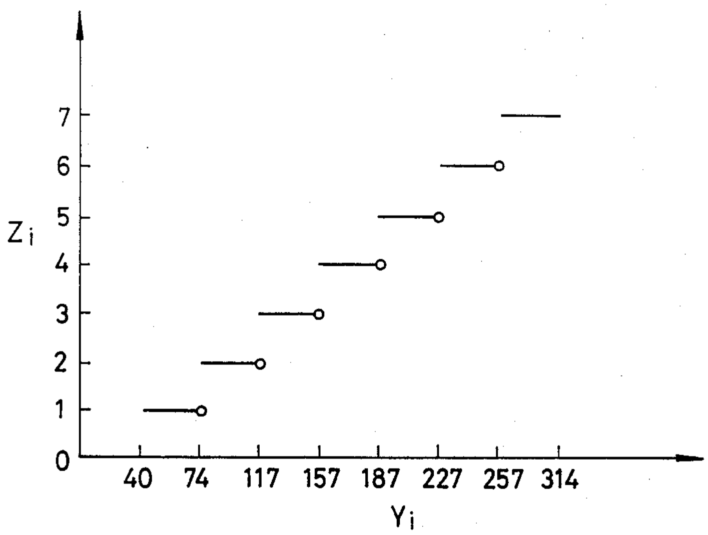
FIG. 16 is a graph for calculating the heat accumulation state information Zi.

According to Table 5, as shown in, for example, (c), when the picture elements D3 and D6 are black, Yi is 70. Then, Yi is converted to a 8-level (from "0" to "7") heat accumulation state information Zi. In FIG. 16, Yi is plotted in abscissa, and Zi is ordinate. At the bottom of Table 5, values of Zi are shown. In the case of (c), Yi and Zi are 70 and 1, respectively.

In Table 6, an example when I1 and I2 are set at 5 msec is shown. In this example, the color of each picture element is the same as in the case of Table 5.

TABLE 6

| Picture element | Example (a) | (b) | (c) | (d) | | (e) |
|---|---|---|---|---|---|---|
| D1 | 0 | 0 | 0 | 1 | . . . | 1 |
| D2 | 0 | 0 | 0 | 0 | . . . | 1 |
| D3 | 0 | 1 | 1 | 0 | . . . | 1 |
| D4 | 0 | 0 | 0 | 1 | . . . | 1 |
| D5 | 0 | 0 | 0 | 0 | . . . | 1 |
| D6 | 1 | 0 | 1 | 1 | . . . | 1 |
| Yi | 40 | 100 | 140 | 127 | . . . | 314 |
| Zi | 1 | 2 | 3 | 3 | . . . | 7 |

$\tau 1$ = 5 msec
$\tau 2$ = 5 msec

According to Table 6, in the case of, for example, (c), Yi and Zi are 140 and 3, respectively. As evident from the comparison of Table 5 with Table 6, the heat accumulation state information Zi changes according to the difference in the interval times I1 and I2.

Figure 17:
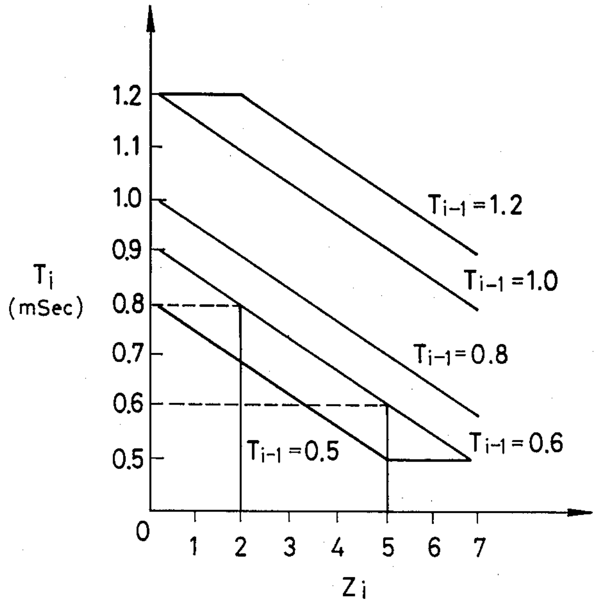
FIG. 17 is a graph showing the relationship between the heat accumulation state information Zi and the corrected pulse width T'i with the heating pulse width Ti−1 of the immediately preceding line as a parameter.

When the heating pulse width Ti applied to the heating element to print at the current time is determined based on the heat accumulation state information Zi and the heating pulse width Ti−1 of the preseding line, the result beocmes as shown in FIG. 17. For example, when the heat accumulation state information Zi is 2 and Ti−1 is 0.6 msec, Ti becomes 0.8 msec, and when Zi is 5 and Ti−1 is 0.6 msec, Ti becomes 0.6 msec.

Figure 18:
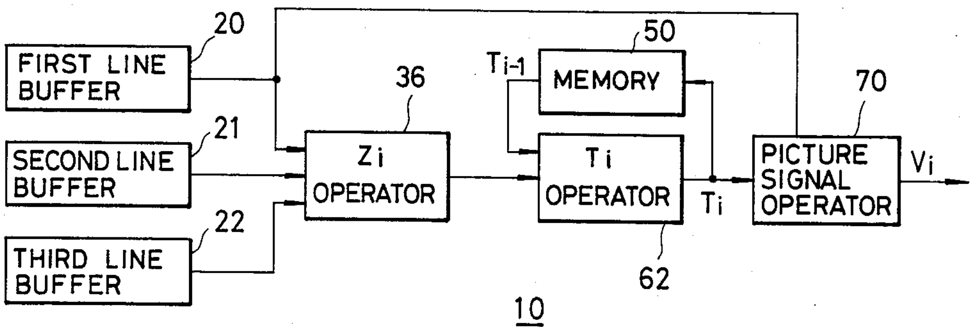
FIG. 18 is a block diagram showing a typical configuration of an apparatus embodying the fourth aspect of the present invention.

FIG. 18 shows a typical configuration of the heat accumulation compensation circuit structured based on the heat accumulation compensation method in line with the fourth embodiment.

Figure 19:
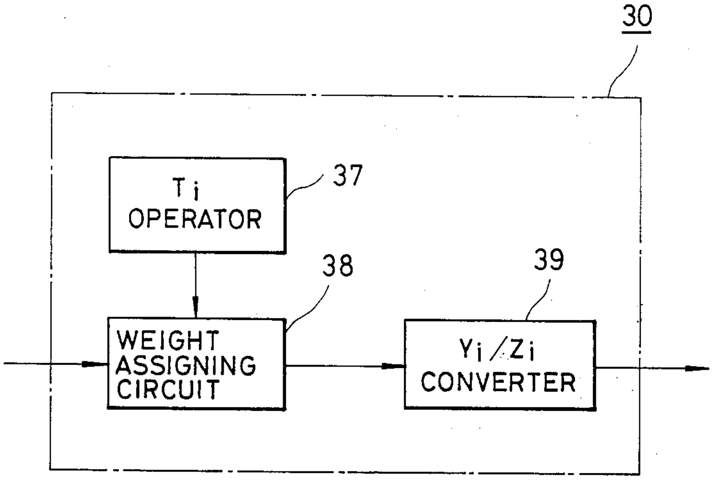
FIG. 19 is a block diagram showing a configuration of a Zi operator in the apparatus of FIG. 18.

In FIG. 18, each of a first line buffer 20, a second line buffer 21 and a third line buffer 22 has memory areas corresponding to the total number of the heating elements of the thermal head. The first line buffer 20 stores the picture information corresponding to the scan line being printed at the current time, the second line buffer 21 stores the picture information corresponding to the scan line printed at the time immediately before, and the third line buffer 22 stores the picture information corresponding to the scan line printed at the time before last, similar to those described previously. A Zi operator 36 calculates the heat accumulation state information Zi of each heating element sequentially based on the picture information stored in the line buffers 20 through 22, and outputs the result thereof to a Ti operator 60. As shown in FIG. 19, the Zi operator 36 comprises an Ii operator 37, a weight assigning circuit 38, and a Yi/Zi converter 39. The Ii operator 37 is comprised of a ROM for storing weight vlaues, for example, as shown in Tables 3 and 4, and outputs the weight values corresponding to the calculated interval time to the weight assigning circuit 38. The weight assigning circuit 38 assigns the weight value to be fed from the Ii operator 37 to the picture information (refer to FIG. 1) to be fed 6 bits by 6 bits for a one-dot heating element, sums up these 6 bits, and outputs the result thereof to the Yi/Zi converter sequentially. The Yi/Zi converter 39 converts sequentially received Yi to the heat accumulation state information Zi of 8 levels from "0" to "7" based, for example, on the relation in FIG. 16, and outputs Zi to the Ti operator 62 sequentially. The weight assigning circuit 38 and the Yi/Zi converter 39 may be comprised of such components as memory means and an arithmetic circuit.

A memory 50 is for storing the information representing the heating pulse width applied to each heating element calculated by the Ti operator 62, and the memory content of the memory 50 is updated as the scan line advances. Accordingly, Ti−1 outputted from the memory 50 and fed back to the Ti operator 60 becomes the information representing the heating pulse width of the previous scan line for the Ti operator 62.

The Ti operator 62 calculates the heating pulse width Ti to be applied to each heating element based on the information Zi and Ti−1 from, for example, the relation shown in FIG. 17, and feeds Ti to the memory 50 and a picture signal operator 70.

The picture signal operator 70 extracts the picture information similar to that described previously, and outputs sequentially extracted picture information. The picture information Vi is fed to the shift register 90 of the thermal head driver circuit shown in FIG. 9, and subsequently operation similar to that described previously is performed, thereby heating the heating elements R1, . . . Rn of the thermal head.

Although the picture elements to be reference for determining the heat history information Xi which are shown in FIG. 1 can give sufficiently satisfactory result, the picture elements are not limited to those shown in FIG. 1. The number of reference picture elements may be lessened accoridng to the requirement in terms of speed and cost, or may be increased if higher precision is required.

Further, though, in the embodiment of the present invention, the heat history information Xi or the heat accumulation state information is divided to 8 levels from "0" to "7", the number of levels is, of course, optional, and the heat accumulation compensation of higher precision may be made by increasing the number of levels to, say, 16 or 32.

Further, while in the embodiment of the present invention the picture element density (shade level) variation is prevented by the variable control of the heating pulse width (duration of energizing) of the pulse to be applied to each heating element of the thermal head, the similar effect may be obtained alternatively by changing the duty of a high frequency pulse applying the high frequency pulse to each heating element. Alternatively, the applied voltage may be subjected to variable control. In conjucntion with the above alternative, the heating pulse width Ti−1 of the immediately preceding line of each heating element to be referenced at the time of heat accumulation compensation allows its alternatives, and the impressed voltage or the duty of the immediately preceding line of each heating element may be referenced.

In addition, there is a system wherein heating elements of the thermal head are divided to a plurality of blocks and driven separately typically for saving power, and in this case providing the aforementioned heat accumulation compensation circuit in each block is a sole modification.

What is claimed is:

1. A heat accumulation compensation method for a thermal head having a plurality of heating elements wherein energy to be applied to each heating element is subjected to control corresponding to heat accumulation state of said each heating element, comprising:

a first step for calculating the heat accumulation state of said each heating element based on the present and past image information of said each heating element and based on present and past image information of heating elements adjacent to each heating element;

a second step for correcting energy applied to said each heating elements in printing the present line according to said calculated heat accumulation state; and a third step for controlling energy to be applied to said each heating element in printing the present line based on said corrected energy and information representing the thermal head base plate temperature.

2. The heat accumulation compensation method of claim 1 wherein calculation of the heat accumulation state in said first step is performed by assigning predetermined weight values corresponding to the extent of the effect of heat accumulation on said each heating element to said image information and summing up said weight values.

3. The heat accumulation compensation method of claim 2 wherein calculation of the heat accumulation state in said first step is performed further by converting the sum resulted from said summation to a multilevel information using a plurality of threashold values.

4. The heat accumulation compensation method of claim 1 wherein the image information in said first step is comprised of image information of the immediately preceding line and the line before last with respect to said each heating element and image information of the present and preceding line with respect to heating elements adjacent to said each heating element.

5. The heat accumulation compensation method of claim 1 wherein said energy is corrected and controlled by changing pulse width of heating pulse to be applied to said each heating element.

6. The heat accumulation compensation method of claim 1 wherein said energy is corrected and controlled by changing voltage of heating pulse to be applied to said each heating element.

7. The heat accumulation compensation method of claim 1 wherein said energy is corrected and controlled by changing duty of high frequency pulse to be applied to said each heating element.

8. The heat accumulation compensation method of claim 1 wherein said information representing said base plate temperature is a value corresponding to the resistance value of a thermistor provided in the thermal head.

9. The heat accumulation compensation method of claim 1 wherein said information representing the base plate temperature is calculated by converting the resistance value of said thermistor provided in the thermal head to a multilevel information using a plurality of different threshold values.

10. The heat accumulation compensation method of claim 8 or 9 wherein said thermistor is respectively provided in a plurality of locations in the base plate of the thermal head, and said information representing said base plate temperature is calculated based on the mean of resistance vlaues of said plurality of the thermistors.

11. The heat accumulation method of claim 8 or 9 wherein said thermistor is respectively provided in a plurality of locations of the thermal head base plate, said information representing said base plate temperature comprising a plurality of information corresponding to resistance values of the plurality of thermistors, and energy to be applied to said each heating element provided in each area assigned to each of said thermistors is controlled by said plurality of information for said each area.

12. A heat accumulation compensation device for a thermal head having a plurality of heating elements wherein energy to be applied to each heating element of the thermal head is controlled according to heat accumulation state of said each heating element, comprising;

a plurality of line buffers for storing image information on a plurality of lines of an original;

first arithmetic means for producing multilevel information by assigning predetermined values to the present and past image information with respect to said each heating element and based on present and past image information of heating elements adjacent said each heating element which are outputted from time to time from said plurality of line buffers, totalizing the weighted image information, and converting the totalized value to multilevel information using a plurality of predetermined values as threshold values;

second arithmetic means for calculating thermal head base plate temperature based on the reistance value of a thermistor provided in said thermal head;

memory means for storing width of each heating pulse applied to said each heating element in printing the immediately preceding line; and third arithmetic means for calculating width of the heating pulse applied to said each heating element in printing the present line based on the outputs of said first arithmetic means, said second arithmetic means and said memory means.

13. A heat accumulation compensation method for a thermal head having a plurality of heating elements wherein energy to be applied to each heating element is controlled according to heat accumulation state of said each heating element, comprising;

a first step for calculating the heat accumulation state of said each heating element by assigning predetermined values to the present and past image information with respect to said each heating element and based on present and past image information of heating elements adjacent to said each heating element, said predetermined values being determined according to information representing temperature of a base plate of the thermal head and the extent of effect of heat accumulation on said each heating element, and totalizing said weighted image information; and a second step for controlling energy to be applied to said each heating element in printing the present line based on the heat accumulation state of said each heating element thus calculated and information representing energy applied to said each heating element in printing the immediately preceding line.

14. The heat accumulation compensation method of claim 13 wherein calculation of the heat accumulation state in said first step is performed by converting said totalized weighted image information into multilevel information using a plurality of different threshold values.

15. The heat accumulation compensation method of claim 13 wherein said image information in said first step is comprised of image information on the immediately preceding line and further preceding line with respect to said each heating element, and image information on the present line and immediately preceding line with respect to heating elements adjacent to said each heating element.

16. The heat accumulation compensation method of claim 13 wherein said energy is controlled by changing pulse width of heating pulse to be applied to said each heating element.

17. The heat accumulation compensation method of claim 13 wherein said energy is controlled by changing voltage of heating pulse to be applied to said each heating element.

18. The heat accumulation compensation method of claim 13 wherein said energy is controlled by changing duty of high frequency pulse to be applied to said each heating element.

19. The heat accumulation compensation method of claim 13 wherein said information representing the base plate temperature is a value corresponding to the resistance value of the thermistor provided in the thermal head.

20. The heat accumulation compensation method of claim 13 wherein said information representing the base plate temperature is calculated by converting the resistance value of the thermistor provided in the thermal head to a multilevel information using a plurality of different threshold values.

21. The heat accumulation compensation method of claim 19 or 20 wherein said thermistor is respectively provided at a plurality of locations of the thermal head base plate, and said information representing said base plate temperature is calculated based on the mean of resistance values of said plurality of thermistors.

22. The heat accumulation compensation method of claim 19 or 20 wherein said thermistor is respectively provided in a plurality of locations of the thermal head base plate, said information representing said base plate temperature comprising a plurality of information corresponding to resistance values of said plurality of thermistors and energy to be applied to said each heating element provided in each area assigned to each of said thermistors is controlled by said plurality of information for said each area.

23. A heat accumulation compensation device for a thermal head having a plurality of heating elements wherein energy to be applied to each heating element is controlled according to heat accumulation state of said each heating element, comprising;

a plurality of line buffers for storing image information covering a plurality of lines;

first arithmetic means for calculating base plate temperature of the thermal head representing information based on resistance value of a thermistor provided in said thermal head;

second arithmetic means for producing multilevel information by assigning predetermined values to present and past information with respect to said each heating element and based on present and past image information of heating elements adjacent to said each heating element which are outputted from time to time from said plurality of line buffers according to said base plate temperature calculated by said first arithmetic means and the extent of effect of heat accumulation on said each heating element, totalizing the weighted image information, and converting the totalized value to multi-level information taking a using of a plurality of predetermined values as threshold values;

memory means for storing width of each heating pulse applied to said each heating element in printing the immediately preceding line of each heating element; and third arithmetic means for calculating width of heating pulse to be applied to said each heating element in printing the present line based on the output of said second arithmetic means and the output of said memory means.

24. A heat accumulation compensation method for a thermal head having a plurality of heating elements, wherein energy to be applied to each individual heating element of the thermal head is controlled according to the heat accumulation state of said individual heating element, comprising;

a first step for calculating the heat accumulation state of said individual heating element based on present and past image information with respect to said individual heating element and based on present and past image information of heating elements adjacent thereto;

a second step for determining the corrected energy to be applied to said individual heating element in printing the present line based on interval time information representing an elapsed time from the printing of the immediately preceding line to the printing of the present line and information representing energy applied to said individual heating element in printing the immediately preceding line; and a third step for controlling energy to be applied to said individual heating element in printing the present line based on said corrected energy and said calculated heat accumulation state.

25. The heat accumulation compensation method of claim 24 wherein calculation of the heat accumulation state in said first step is performed by assigning predetermined values to said image information corresponding to the extent of effect of heat accumulation on said each heating element and totalizing the weighted image information.

26. The heat accumulation compensation method of claim 24 wherein calculation of the heat accumulation state in said first step is performed by converting the totalized weighted image information to a multilevel information using a plurality of different threshold values.

27. The heat accumulation compensation method of claim 24 wherein said image information in said first step is comprised of image information of the immediately preceding line and further preceding line with respect to said each heating element and image information of the present and immediately preceding line with respect to heating elements adjacent said each heating element.

28. The heat accumulation compensation method of claim 24 wherein said energy is corrected and controlled by changing pulse width of heating pulse to be applied to said each heating element.

29. The heat accumulation compensation method of claim 24 wherein said energy is corrected and controlled by changing voltage of heating pulse to be applied to said each heating element.

30. The heat accumulation compensation method of claim 24 wherein said energy is corrected and controlled by changing duty of high frequency pulse to be applied to said each heating element.

31. The heat accumulation compensation method of claim 24 wherein said interval time is a value corresponding to a time required from printing start of the preceding line to printing start of the present line.

32. A heat accumulation compensation device for a thermal head having a plurality of heating elements wherein energy to be applied to each heating element of the thermal head is controlled according to heat accumulation state of said each heating element, comprising:

a plurality of line buffers for storing image information on a plurality of lines of an original;

first arithmetic means for producing multilevel information by assigning predetermined values to present and past image information with respect to said each heating element and based on present and past image information of heating elements adjacent to said each heating element which are outputted from time to time from said plurality of line buffers, totalizing the weighted image information and converting the totalized value to multilevel information using a plurality of different predetermined values as threshold values:

memory means for storing width of each heating pulse applied to said each heating element in printing the immediately preceding line;

second arithmetic means for calculating time interval from printing of the preceding line to printing of the present line;

third arithmetic means for calculating pulse width of the heating pulse outputted from said memory means based on the output of said second arithmetic means; and fourth arithmetic means for calculating pulse width of heating pulse to be applied to said each heating element in printing the present line based on the outputs of said first and said third arithmetic means.

33. A heat accumulation compensation method for a thermal head having a plurality of heating elements, wherein energy to be applied to each individual heating element of the thermal head is controlled according to the heat accumulation state of said individual heating element, comprising:

a first step for calculating the heat accumulation state of said individual heating element by assigning to the position presently to be printed by said individual heating element and positions adjacent thereto predetermined weight values corresponding to time interval information representing the elapsed time from the printing of the immediately preceding line to the printing of the present line, and totalizing said assigned weight values based on present and past image information of said individual heating element and based on present and past image information of heating elements adjacent thereto, said totalized weight values indicating the extent of effect of heat accumulation on each heating element; and a second step for controlling energy to be applied to said individual heating element in printing the present line based on said calculated heat accumulation state of said individual heating element and information representing energy applied to said individual heating element in printing the immediately preceding line.

34. The heat accumulation compensation method of claim 33 wherein calculation of the heat accumulation state in said first step is performed further by converting a sum resulted from said totalization to multilevel information using a plurality of different threshold values.

35. The heat accumulation compensation method of claim 33 wherein image information in said first step is comprised of image information of the immediately preceding and further preceding line with respect to said each heating element and image information of present and immediately preceding line with respect to heating elements adjacent to said each heating element.

36. The heat accumulation compensation method of claim 33 wherein said energy is controlled by changing pulse width of heating pulse to be applied to said each heating element.

37. The heat accumulation compensation method of claim 33 wherein said energy is controlled by changing voltage of heating pulse to be applied to said each heating element.

38. The heat accumulation compensation method of claim 33 wherein said energy is controlled by changing duty of high frequency pulse to be applied to said each heating element.

39. The heat accumulation compensation method of claim 33 wherein said interval time information is a value corresponding to time from printing start of the preceding line to printing start of the present line.

40. A heat accumulation compensation device for a thermal head having a plurality of heating elements wherein energy to be applied to each heating element of the thermal head is controlled according to heat accumulation state of said each heating element, comprising;

a plurality of line buffers for storing image information covering a plurality of lines;

first arithmetic means for calculating time interval from printing of the preceding line to printing of the present line;

second arithmetic means for assigning predetermined weight values corresponding to the interval time calculated by said first arithmetic means and the extent of the effect of heat accumulation on said each heating element to present and past image information with respect to said each heating element and based on present and past image information of heating elements adjacent to said each heating element, said present and past image information being outputted from said plurality of line buffers from time to time, and by totalizing the weighted image information, and converting the totalized image information into multilevel information using a plurality of different predetermined values as threshold values;

memory means for storing each heating pulse width of the preceding line with respect to said each heating element; and third arithmetic means for calculating pulse width of heating pulse to be applied to said each heating element in printing the present line based on the outputs of said memory means and said second arithmetic means.

41. A heat accumulation compensation method for a thermal head having a plurality of heating elements wherein energy to be applied to each heating element of the thermal head is controlled according to heat accumulation state of said each heating element, comprising;

a first step for calculating the heat accumulation state of said each heating element based on present and past image information of said each heating element and based on present and past image information of heating elements adjacent to said each heating element;

a second step for correcting energy applied to said each heating element in printing the present line according to said calculated heat accumulation state;

a third step for further correcting said corrected energy according to information representing base plate temperature of the thermal head; and a fourth step for correcting the energy corrected in said third step based on interval time information representing time required from printing of the preceding line to printing of the present line and outputting said corrected energy as applied energy to be applied to said each heating element in printing the present line.

42. The heat accumulation compensation method of claim 41 wherein calculation of the heat accumulation state in said first step is performed by assigning predetermined weight values corresponding to the extent of the effect of heat accumulation on said each heating element to said image information, and totalizing said weighted image information.

43. The heat accumulation correction method of claim 41 wherein calculation of the heat accumulation state in said first step is performed by converting the totalized image information into multilevel information using a plurality of different threshold values.

44. The heat accumulation compensation method of claim 41 wherein image information in said first step is comprised of image information of the immediately preceding and further preceding lines with respect to said each heating element and image information of the present and immediately preceding lines with respect to heating elements adjacent to said each heating element.

45. The heat accumulation compensation method of claim 41 wherein said energy is corrected and controlled by changing pulse width of heating pulse to be applied to said each heating element.

46. The heat accumulation compensation method of claim 41 wherein said energy is corrected and controlled by changing voltage of heating pulse to be applied to said each heating element.

47. The heat accumulation compensation method of claim 41 wherein said energy is corrected and controlled by changing duty of high frequency pulse to be applied to said each heating element.

48. The heat accumulation compensation method of claim 41 wherein said information representing the base plate temperature is a value corresponding to the resistance value of a thermistor provided in the thermal head.

49. The heat accumulation compensation method of claim 41 wherein said information representing the base plate temperature is calculated by converting the resistance value of the thermistor provided in the thermal head to multilevel information using a plurality of different threshold values.

50. The heat accumulation compensation method of claim 48 or 49 wherein said thermistor is provided at a plurality of locations on the thermal head base plate, said information representing the base plate temperature being calculated based on the mean of the resistance values of said plurality of thermistors.

51. The heat accumulation compensation method of claim 48 or 49 wherein said thermistor is respectively provide at a plurality of locations on the thermal head base plate, said information representing the base plate temperature comprising a plurality of information corresponding to resistance values of said plurality of thermistors, and energy to be applied to said each heating element provided in each area in base plate assigned to each of said thermistors is controlled by said plurality of information for said each area.

52. The heat accumulation compensation method of claim 41 wherein said interval time information is a value corresponding to time required from printing start of the preceding line to printing start of the present line.

53. A heat accumulation compensation method for a thermal head having a plurality of heating elements, wherein energy to be applied to each individual heating element is subjected to control corresponding to the heat accumulation state of said individual heating element, comprising:

a first step for calculating the heat accumulation state of said individual heating element based on present and past image information of said individual heating element and based on present and past image information of heating elements adjacent thereto;

a second step for determining the corrected energy to be applied to said individual heating element in printing the present line according to said calculated heat accumulation state, and information representing energy applied to said individual heating element in printing the immediately preceding line; and a third step for controlling energy to be applied to said individual heating element, in printing the present line, based on said corrected energy.

54. The heat accumulation compensation method of claim 24 wherein the calculation for said heat accumulation state is based on past image information of said individual heating element and past and present image information of heating elements adjacent thereto.

55. In a thermal printer having a print head, means for establishing weighted energy correction values as determined solely by pixel data printable in neighboring pixel positions independent of actual energy level applied thereto, means, responsive to actual pixel data to be printed in said neighboring pixel positions, for obtaining from said establishing means the weighted energy correction value for a particular pixel to be printed, and means for energizing said print head, for said particular pixel to be printed, with an amount of energy to be determined by said obtained weighted energy correction value.

56. A thermal printer according to claim 55 wherein said means for energizing further comprises:

means for modifying the amount of energy used to energize said print head both in response to said value obtained from said establishing means and to the amount of energy applied to the same print head when printing previous pixels.

57. A heat accumulation compensation method for a thermal head having a plurality of heating elements wherein energy to be applied to each heating element of the thermal head is controlled according to heat accumulation state of said each heating element, comprising;

a first step for calculating the heat accumulation state of said each heating element based on present and past image information of said each heating element and based on present and past image information of heating elements adjacent to said each heating element;

a second step for correcting energy applied to said each heating element in printing the present line according to said calculated heat accumulation state and information representing energy applied to said individual heating element in printing the immediately preceding line; and a third step for further correcting said corrected energy according to information representing base plate temperature of the thermal head; and a fourth step for correcting the energy corrected in said third step based on interval time information representing time required from printing of the preceding line to printing of the present line and outputting said corrected energy as applied energy to be applied to said each heating element in printing the present line.

* * * * *